US008530011B2

(12) United States Patent
Kleinhempel et al.

(10) Patent No.: US 8,530,011 B2
(45) Date of Patent: Sep. 10, 2013

(54) INSULATING GLASS UNIT WITH CRACK-RESISTANT LOW-EMISSIVITY SUSPENDED FILM

(75) Inventors: Ronny Kleinhempel, Gelenau (DE); Julius G. Kozak, Antioch, CA (US); Roland C. Thielsch, Dresden (DE); Richard T. Wipfler, Menlo Park, CA (US); Christian H. Stoessel, Santa Rosa, CA (US); Lee C. Boman, Belmont, CA (US)

(73) Assignee: Southwall Technologies Inc., Palo Alto, CA (US)

( * ) Notice: Subject to any disclaimer, the term of this patent is extended or adjusted under 35 U.S.C. 154(b) by 318 days.

(21) Appl. No.: 12/966,469

(22) Filed: Dec. 13, 2010

(65) Prior Publication Data
US 2012/0148863 A1    Jun. 14, 2012

(51) Int. Cl.
*E06B 3/00* (2006.01)
*E04C 2/54* (2006.01)

(52) U.S. Cl.
USPC .......................... 428/34; 52/786.11; 156/109

(58) Field of Classification Search
USPC ................. 428/34, 698, 699, 700, 701, 702; 52/786.1, 786.11; 156/107, 109
See application file for complete search history.

(56) References Cited

U.S. PATENT DOCUMENTS

| 4,335,166 A | 6/1982 | Lizardo et al. |
| 4,386,130 A | 5/1983 | Hayashi et al. |
| 4,419,386 A | 12/1983 | Gordon |
| 4,520,611 A * | 6/1985 | Shingu et al. ............... 52/786.11 |
| 4,536,424 A * | 8/1985 | Laurent ........................... 428/34 |
| 4,799,745 A | 1/1989 | Meyer et al. |
| 5,061,568 A | 10/1991 | Kessel et al. |
| 5,225,273 A | 7/1993 | Mikoshiba |
| 5,306,547 A * | 4/1994 | Hood et al. ................... 428/213 |
| 5,325,579 A | 7/1994 | Baier |
| 5,532,062 A | 7/1996 | Miyazaki et al. |
| 5,983,593 A * | 11/1999 | Carbary et al. ............. 52/786.11 |
| 6,261,694 B1 | 7/2001 | Iacovangelo |
| RE37,446 E | 11/2001 | Miyazaki et al. |
| 6,333,084 B1 | 12/2001 | Woodard et al. |
| 6,503,636 B1 | 1/2003 | Le Masson et al. |
| 6,582,809 B2 | 6/2003 | Boire et al. |
| 6,805,960 B1 | 10/2004 | Demiryont |
| 6,919,134 B2 | 7/2005 | Mitsuishi et al. |
| 6,974,629 B1 | 12/2005 | Krisko et al. |
| 7,122,252 B2 | 10/2006 | Hoffman |
| 7,150,916 B2 | 12/2006 | Lemmer et al. |
| 7,153,577 B2 | 12/2006 | Wang et al. |
| 7,521,096 B2 | 4/2009 | Lemmer et al. |
| 7,641,978 B2 | 1/2010 | Veerasamy |
| 7,758,915 B2 | 7/2010 | Hoffman |
| 7,771,830 B2 | 8/2010 | Neuman et al. |
| 2009/0068384 A1 | 3/2009 | Seth et al. |

FOREIGN PATENT DOCUMENTS
WO    WO2009085741 A2    7/2009

* cited by examiner

*Primary Examiner* — Donald J Loney
(74) *Attorney, Agent, or Firm* — Eric D. Middlemas

(57) ABSTRACT

A low-e insulating glass unit has a suspended, coated IR reflecting polymer sheet under tension, e.g. from heat shrinkage. The polymer sheet is coated with a multilayer stack of dielectric and metallic layers, including at least one silver layer deposited upon a zinc oxide seed layer that is at most 15 nm thickness. The use of zinc oxide ensures good seeding for high quality silver layer growth, thereby providing low emissivity. The thinness of the zinc oxide ensures that it resists cracking when the polymer sheet is tensioned.

14 Claims, 4 Drawing Sheets

INSULATING GLASS UNIT WITH CRACK-RESISTANT LOW-EMISSIVITY SUSPENDED FILM

TECHNICAL FIELD

The present invention relates to insulating glass units (IGUs) having a low emissivity (low-E) coating stack for films that are suspended and tensioned in the IGUs, with particular emphasis upon both the quality of the infrared reflecting layer formed in the coating stack and the resistance of the low-E coating stack to cracking or crazing.

BACKGROUND ART

U.S. Pat. No. 4,335,166 to Lizardo et al. describes an insulating glass unit (IGU) comprising a frame with spacers that support a heat-shrinkable plastic sheet between a pair of spaced apart, but substantially parallel, glass panes to provide an integral unit.

Heating the assembled unit causes the plastic sheet to shrink so as to become taut and wrinkle-free. The plastic sheet may be a polyethylene terephthalate (PET) film that can be coated on one or both sides with an infrared reflective material.

U.S. Pat. No. 4,799,745 to Meyer et al. describes visually transparent, infrared (IR) reflecting composite films useful in IGUs like that described in the aforementioned Lizardo patent. A transparent support can be selected from among rigid and non-rigid but minimally stretchable solids, including glass and various polymers (including PET). A layer stack of 5 or 7 alternating dielectric and metal layers is sputter-deposited onto one surface of the support. The dielectric layers can be composed of an inorganic metal or semimetal oxide or salt having a refractive index between 1.75 and 2.25, such as indium oxide, tin oxide, titanium dioxide, silicon dioxide, bismuth oxide, chromium oxide, zinc sulfide, magnesium fluoride, or mixtures thereof. Polymer dielectrics are also disclosed. The metal layers can be composed of silver, gold, platinum, palladium, aluminum, copper, nickel, or alloys thereof (e.g., silver alloyed with up to 25% gold). Spacer dielectric layers between the two or three metal layers have thicknesses between 40-200 nm, preferably 50-110 nm, and especially 70-100 nm. Boundary dielectric layers on the outside of the stack have thicknesses between 20-150 nm, preferably 25-90 nm, and especially 30-70 nm. (These thicknesses are for the inorganic dielectric materials. Polymer dielectric layers with their lower refractive index are disclosed to be somewhat thicker.) The metal layers have a combined total thickness between 12-80 nm, with each metal layer having a thickness between 4-40 nm, preferably 4-17 nm, especially 5-13 nm, with 10-12 nm each indicated for two-metal-layer stacks and 5-10 nm each for three-metal-layer stacks.

A variety of window assemblies have a film coating laminated to or deposited directly onto one or more glass substrates, rather than suspend a sheet in a space between pairs of glass panes.

U.S. Pat. No. 6,503,636 to Le Masson et al. describes a transparent polymer (e.g. polyester) substrate that is provided with a stack of layers including at least one silver layer reflecting thermal radiation. The stack is constructed to prevent stresses from causing it to delaminate or curl up. In particular, the presence of an AlN layer under tensile stress compensates for the compressive stresses in a less than 15 nm thick ZnO layer contiguous with the silver layer, so that the film will lie flat when laminated.

U.S. Reissued Patent RE 37,446 and U.S. Pat. No. 5,532,062, both to Miyazaki et al., describe low emissivity films comprising a glass substrate coated with a stack of alternating oxide and metallic films. The oxide film furthest from the substrate has an internal stress not more than $1.1 \times 10^{10}$ dyne/$cm^2$ in order to prevent exfoliation of that surface film from the underlying metal layer due to moisture damage, with consequent turbidity or haze. In order to achieve this internal stress reduction, the 20-70 nm thick, outermost ZnO film is doped with at least one of Si, B, Ti, Mg, Cr, Sn or Ga in a total of up to 10 atomic %, and preferably 2 to 6 atomic %, with respect to the total quantity including Zn. The other oxide layers closer to the substrate may be selected from ZnO, SfO$_2$, ZnO—SnO$_2$ multi-layers, or a doped ZnO like the outermost oxide layer. At least one of the metal film layers may be an IR reflecting layer composed of Ag, or an alloy whose major component is Ag including at least one of Au, Cu and Pd.

Zinc oxide is a well-known seed layer for the growth of silver. The thicker the ZnO seed layer, the better the epitaxial growth of silver on the seed. This results in higher quality silver and consequently a lower emissivity for a given area-specific amount of silver. However, in contexts where a film layer is suspended in tension between windowpanes rather than directly coated onto a windowpane, the brittleness of the highly crystalline zinc oxide becomes a problem. Shrinking or tensioning of the film tends to cause zinc oxide layers to experience crazing, forming a network of myriad visible cracks. Too much shrinking ($\geq \approx 1.0\%$) results in cracked film. However, too little shrinking ($\leq \approx 0.5\%$) results in sagging or wrinkled film that is also visible as image distortions reflected from the film within the window. The distortion from low film tension is exaggerated when the IGU is exposed to elevated ambient temperatures since the thermal expansion coefficient of the film is higher than that of the glass panes.

Traditionally this has not been a problem because $In_2O_3$ has been used as the seed layer material, since $In_2O_3$ has a more amorphous or glassy structure in comparison and is therefore less subject to crazing. However, $In_2O_3$ is not as good a seed for the deposition of high quality (lower emissivity) silver.

SUMMARY DISCLOSURE

An IGU is provided wherein the suspended and tensioned coated film has a ZnO seed layer that is at most 15 nm thick. The thinner ZnO is better able to withstand the strain of a tensioned film without crazing, while still able to serve as an adequate seed for high quality silver deposition.

DETAILED DESCRIPTION

Figures 1A, 1B:
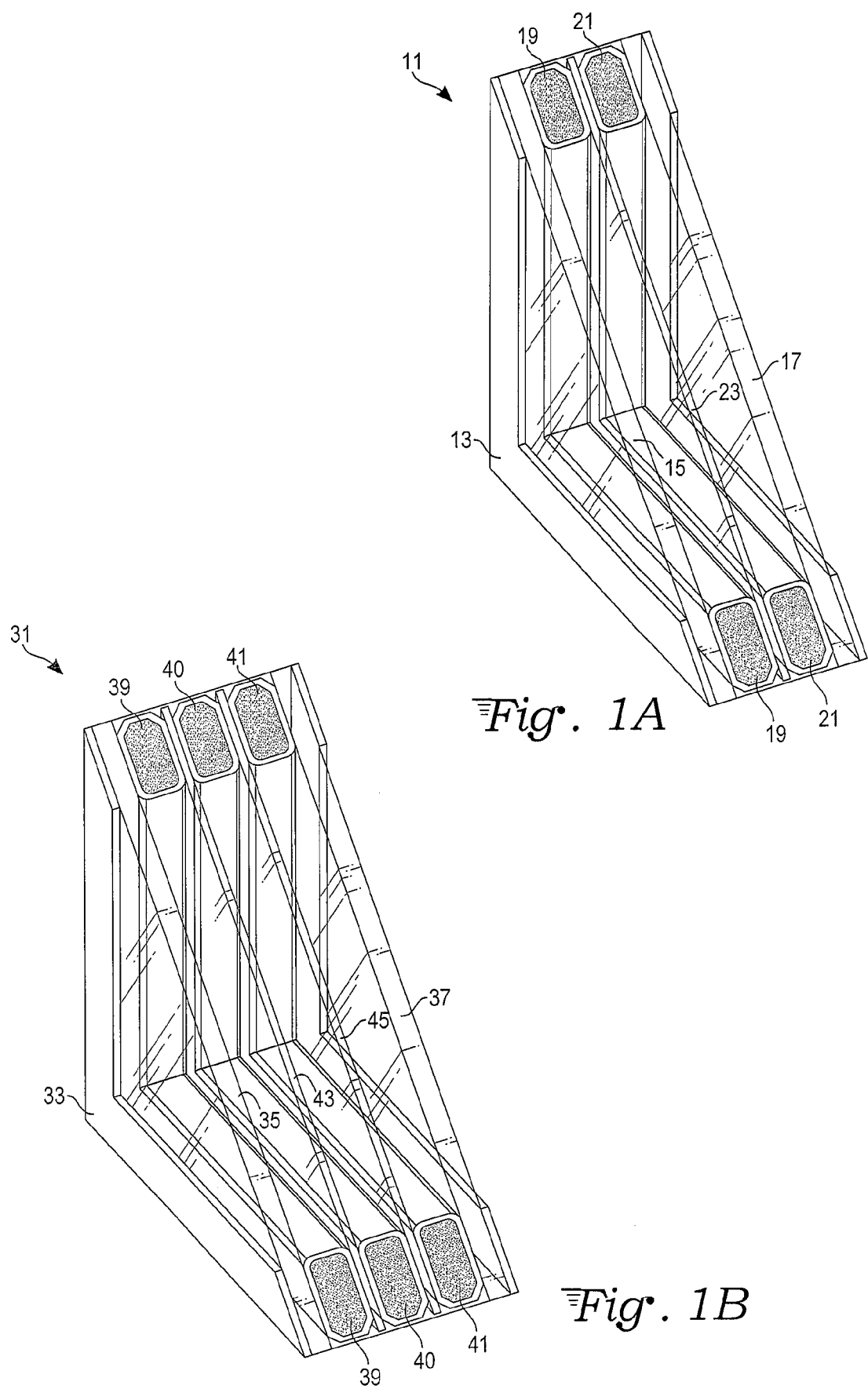
FIGS. 1A and 1B are perspective views of corner portions of two insulating glass unit (IGU) embodiments in accord with the present invention installed within a frame. The IGU in FIG. 1A has a single suspended film, while the IGU in FIG. 1b is provided with two suspended films.

With reference to FIG. 1A, an IGU 11 is shown, here as installed within an optional frame 13. The IGU 11 itself includes a pair of glass panes 15 and 17, a pair of spacers 19 and 21, and a coated sheet 23 suspended between the panes 15 and 17. The spacers 19 and 21 support the panes 15 and 17 and sheet 23 in a spaced apart and substantially parallel relation. The coated sheet 23 is transparent to visible light, but reflective of infrared (or thermal) light due to the low emissivity coating. Additionally, the sheet 23 embodies certain improvements in crack resistance while maintaining a desired low emissive property.

An alternative embodiment is seen in FIG. 1B, wherein an IGU 31 includes a pair of glass panes 35 and 37, three spacers 39-41, and a pair of coated sheets 43 and 45 suspended between the pains 35 and 37. As in the first embodiment, the spacers 39-41 support the panes 35 and 37 and the pair of sheets 43 and 45 in mutually spaced apart and substantially parallel relation to one another. Both sheets are transparent and resistant to cracking under tension. At least one, and preferably both, of the sheets 43 and 45 exhibit the infrared reflectivity, low emissivity properties of sheet 23.

Again, the IGU 31 is shown installed in an optional frame 33. Frames 13 or 33, not part of the invention itself, may be provided by secondary window manufacturers who purchase IGUs 11 or 31 from a primary manufacturer of the IGUs themselves, e.g. to supply decorative features to the windows they sell directly to consumers.

Figure 2:
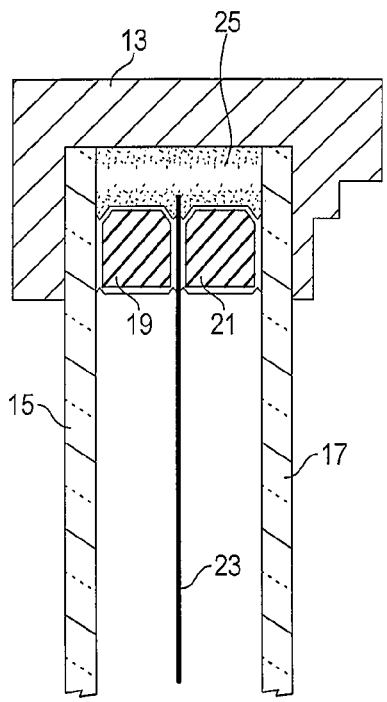
FIG. 2 is a side sectional view of the IGU in FIG. 1A.

With reference to FIG. 2, a sectional view of FIG. 1A, shows that the spacers 19 and 21 are located only the perimeter or edges of the respective panes 15 and 17 and sheet(s) 23. The panes 15 and 17 and sheet 23 may be bonded to the spacers 19 and 21 using an adhesive sealant (not shown), which could be a poly-isobutylene (PIB) adhesive. A secondary sealant 25, e.g. of polyurethane or silicone, ensures that the interior of the IGU is sealed from moisture. Further, the spacers 19 and 21 may be filled with a desiccant material to remove any residual moisture between the panes to prevent fogging of the IGU.

Figure 3:
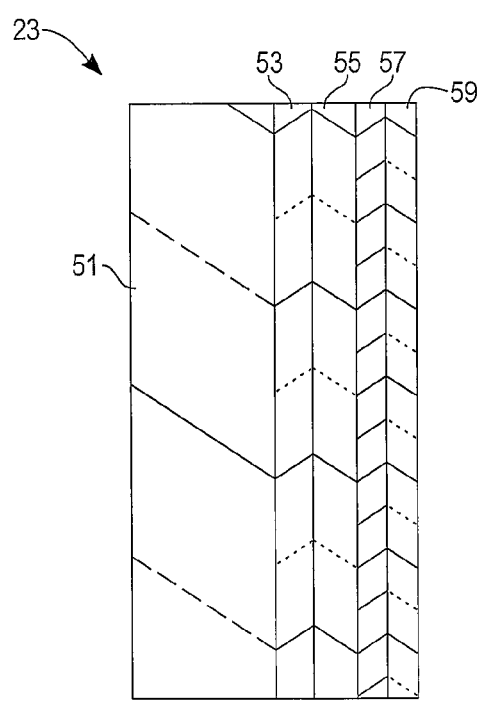
FIG. 3 is a side sectional view of a first coated film embodiment in accord with the present invention and usable in the IGU embodiments of FIGS. 1A and 1B.

With reference to FIG. 3, the sheet 23 (and likewise, at least one of the sheets 43 and 45 in FIG. 1B), is a visually transparent, infrared reflecting, composite film in which a series of layers 53-59 are coated onto a surface of a polymer substrate 51. In particular, the sheet 23 may be a polyethylene terephthalate (PET) film 51 coated with a stack of dielectric and metal layers 53-59. Varieties of PET film are available with heat shrink properties that allow the film to be tensioned (made taut) after assembly. This substrate is typically from 25 to over 125 micrometers thick.

The first layer 53 immediately adjacent to the polymer substrate 51 may be an amorphous dielectric, such as indium oxide ($In_2O_3$). it is typically about 20 to 80 nm thick.

The second layer 55 may be the seed layer, composed of a more crystalline dielectric than the indium oxide layer 53. In particular, a seed layer 55 in accord with present invention is a zinc-based oxide layer that is a most 15 nm, and typically 5 to 10 nm thick. The zinc-based oxide layer is typically selected from any of a variety of silver-seeding layers including ZnO, aluminum-doped zinc oxide (with up to about 2% Al) (commonly known as ZAO), gallium-doped zinc oxide (with up to about 2% Ga)(commonly known as ZGO), ZnO/$SnO_2$ (with the Sn content between 1% and 10% of the total zinc and tin content), and ZnO/$In_2O_3$ (with the In content being approximately 10% of the total zinc and indium content). The selected zinc-based oxide material may be sputtered from a ceramic or metallic target. The thinness of this ZnO layer 55 gives it the ability to withstand the strain of the tensioned sheet without cracking. A minimum thickness of 5 nm ensures that the outer surface of the ZnO layer 55 can serve as an adequate seed for high quality silver deposition.

The third coating layer 57 is the metallic infrared reflective low emissivity coating, which may be composed of silver or of a silver alloy that includes palladium, copper and/or gold. The thickness of the metallic layer 57 is typically 5 to 60 nm, giving it adequate visible light transmission.

A very thin (<5 nm) cap layer (not shown), such as nichrome (NiCr), Ti, ZAO or nichrome nitride ($NiCrN_x$), may be coated on top of the silver layer to preserve the silver quality during the deposition of the outer dielectric.

An outer dielectric layer 59 is formed on the metallic layer 57. This may be composed of indium oxide, and is typically 20 to 50 nm thick. The choice of indium oxide for dielectric layers 53 and 59 is motivated by its crack resistance due to its amorphous quality, while zinc oxide is used for the seed layer to ensure high quality silver deposition for low emissivity. But the zinc oxide seed layer is kept thin enough to minimize its susceptibility to cracking under stress.

Figure 4A:
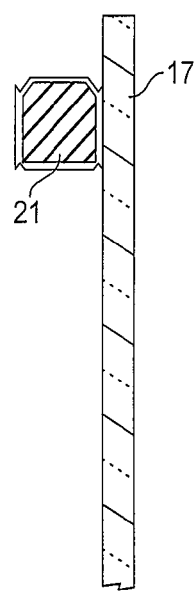
FIGS. 4A through 4D are side sectional views corresponding to FIG. 2 that illustrate the steps of assembling an IGU with suspended tensioned film.
Figure 4B:
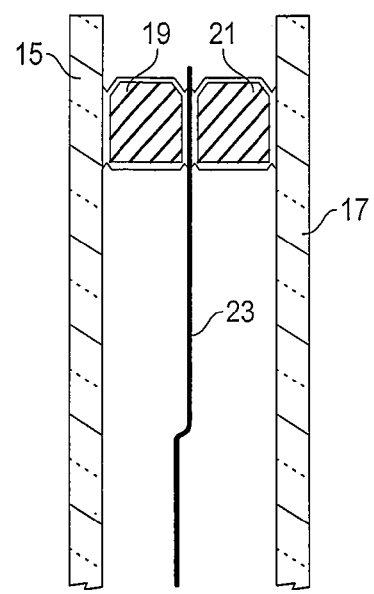
Figure 4C:
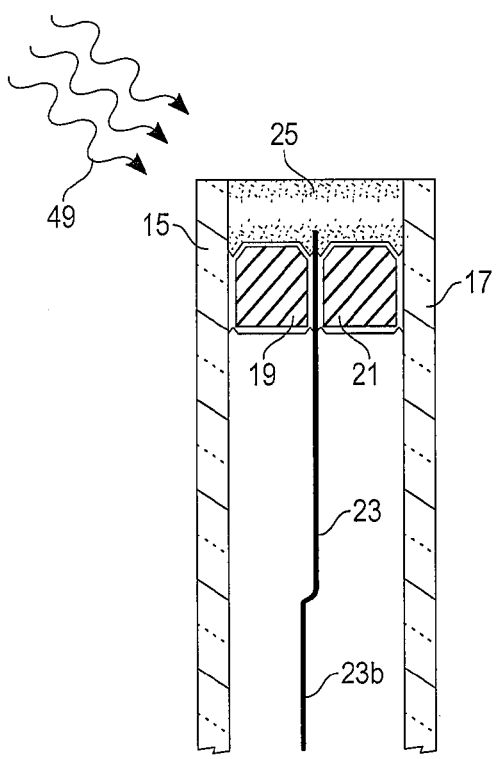
Figure 4D:
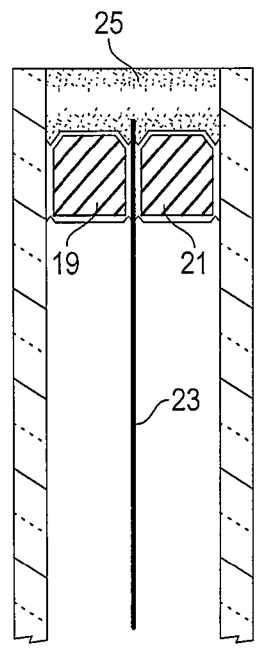

As seen in FIG. 4A, assembly of an IGU begins by bonding a window pane 17 to one of the spacers 21 using an adhesive sealant. Likewise, window pane 15 is bonded to the other spacer 19. The sheet 23 is bonded to both spacers 19 and 21, leaving the structure seen in FIG. 4B, but generally will not be sufficiently taut to remove all wrinkles 23b. In FIG. 4C, the assembled unit is subject to a heat treatment 49 causes the PET substrate of sheet 23 to shrink. This removes any wrinkles 23b, leaving a generally planar sheet 23, suspended in substantially parallel relation to the panes 15 and 17, as seen in FIG. 4D. Although heating the assembled unit to cause the plastic sheet to shrink so as to become taut and wrinkle-free is one way to tension the sheet 23, other tensioning techniques could be used. In any case, despite the strain, the coating materials, including the zinc oxide seed layer 55, are resistant to cracking.

Figure 5:
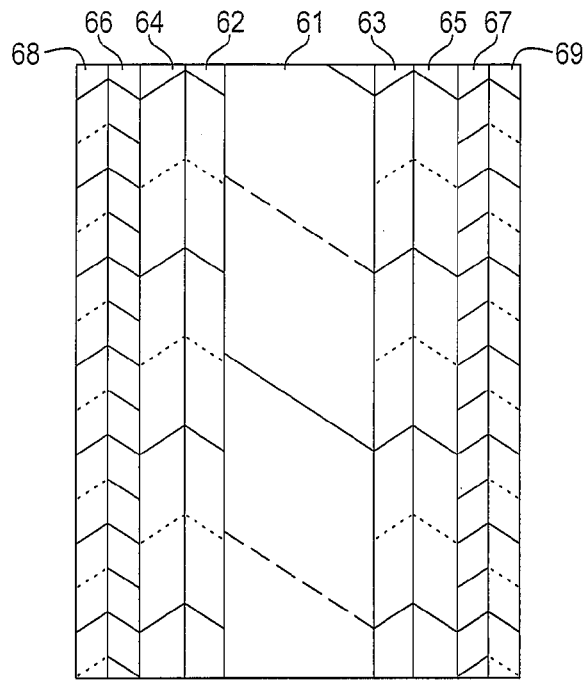
FIGS. 5 and 6 are side sectional views of second and third coated film embodiments in accord with the present invention.

With reference to FIG. 5, an alternative embodiment of the suspended sheet has the polymer substrate 61 coated on both of its surfaces. As in FIG. 3, the coating begins on both surfaces with generally amorphous dielectric coatings 62 and 63, e.g. of $In_2O_3$, typically 20 to 80 nm thick. Seed layers 64 and 65 are composed of thin ZnO of at most 15 nm thickness. Metallic IR reflecting layers 66 and 67, typically of silver or a silver alloy, also 5 to 60 nm thick, are deposited on the respective seed layers. The use of zinc oxide ensures high quality deposition of the silver, giving the sheet its markedly lower emissivity. Finally, another amorphous dielectric coating 68 and 69, e.g. of 20 to 60 nm $In_2O_3$, serves as protective outer coat on the silver.

Figure 6:
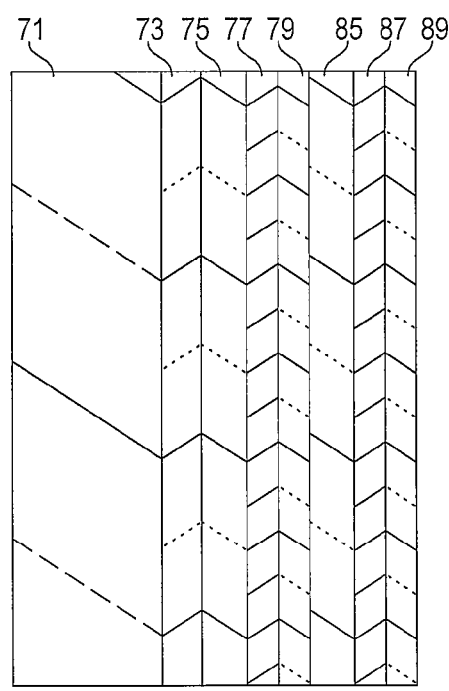

With reference to FIG. 6, yet another embodiment of the suspended film sheet has a thicker stack with multiple IR reflecting layers 77 and 87. Thus, a PET substrate 71 is coated with a first set of amorphous dielectric, crystalline seed dielectric, metallic IR reflecting, and amorphous dielectric layers 73-79, followed by yet another sequence of seed dielectric layer 85, metallic IR reflecting layer 87, and amorphous outer dielectric layer 89. This can be repeated any number of times, provided that the cumulative thickness of all of the metallic layers does not exceed 60 nm, in order that there be adequate visible transparency through the IGU. As before, the amorphous dielectric may be chosen to be $In_2O_3$, while the various seed layers are zinc oxide, each not exceeding 15 nm in thickness for adequate crack resistance.

What is claimed is:

1. An insulating glass unit, comprising:
    a pair of glass panes in a parallel, spaced apart relation; and at least one transparent, heat-shrunk, tensioned polymer sheet in a spaced apart parallel relation between the glass panes, at least one surface of at least one polymer sheet having a substantially transparent coating comprising a composite multilayer stack of dielectric and metallic layers, the stack comprising an amorphous indium oxide dielectric layer about 20 to about 80 nm thick in contact with the polymer sheet, a crystalline zinc oxide seed layer about 5 to about 15 nm thick deposited on the amorphous indium oxide dielectric layer, at least one low-emissivity silver layer grown upon the zinc oxide seed layer, and an indium oxide protective layer.

2. The insulating glass unit as in claim 1, wherein the polymer sheet is polyethylene terephthalate.

3. The insulating glass unit as in claim 1, wherein the zinc oxide seed layer has a thickness in a range between 5 and 10 nm.

4. The insulating glass unit as in claim 1, wherein the multilayer stack further comprises a cap layer comprising nichrome, titanium, zinc aluminum alloy or nichrome nitride at most 5 nm thick coated on top of the silver layer.

5. The insulating glass unit as in claim 1, wherein the silver layer has a thickness in a range between 5 and 60 nm.

6. The insulating glass unit as in claim 1, wherein the indium oxide protective layer has a thickness in a range between 20 and 60 nm.

7. The insulating glass unit as in claim 1, wherein the multilayer stack further comprises one or more sequences of zinc oxide seed layer, silver layer and indium oxide protective layer, each zinc oxide seed layer having a thickness of 5 to 15 nm, and the total cumulative thickness of all silver layers being at most 60 nm.

8. The insulating glass unit as in claim 1, wherein the indium oxide protective layer is deposited on the silver layer.

9. The insulating glass unit as in claim 1, wherein the multilayer stack is coated upon both surfaces of at least one polymer sheet.

10. The insulating glass unit as in claim 1, which comprises two or more transparent polymer sheets supported under tension by a frame in parallel, spaced apart relation to each other between the glass panes.

11. A process for the preparation of a insulating glass unit, comprising:
   (i). coating a polymer sheet with a series of layers, the layers comprising an amorphous indium oxide layer having a thickness of about 20 to about 80 nanometers on the surface of the polymer sheet; a crystalline, zinc-based oxide seed layer having a thickness about 5 to about 10 nanometers on the surface on the amorphous indium oxide layer; and a silver layer having a thickness of about 5 to about 60 nanometers on the surface of the zinc-based oxide seed layer to produce a coated, polymer sheet transparent to visible light;
   (iI). bonding the coated, polymer sheet to two or more spacers between a pair of glass panes to produce an assembled glass unit having the coated, polymer sheet suspended in a spaced apart and parallel relation to the pair of glass panes; and
   (iii). heat shrinking the coated polymer sheet.

12. The process as in claim 11, wherein the polymer sheet comprises polyethylene terephthalate.

13. The process as in claim 11, wherein the series of layers further comprise a cap layer on top of the silver layer, the cap layer comprising nichrome, titanium, zinc aluminum alloy or nichrome nitride at most 5 nm thick.

14. The process as in claim 11, wherein the series of layers is coated upon both surfaces of the polymer sheet.

* * * * *